United States Patent [19]
Dalton, III et al.

[11] Patent Number: 5,217,607
[45] Date of Patent: Jun. 8, 1993

[54] WATER DECONTAMINATION SYSTEM WITH FILTER, ELECTROSTATIC TREATMENT AND UV RADIATION CHAMBER

[75] Inventors: William E. Dalton, III, South Hadley, Mass.; Frank Wegener, New Castel, Calif.

[73] Assignee: Diamond Water Systems, Inc., Holyoke, Mass.

[21] Appl. No.: 839,367

[22] Filed: Feb. 21, 1992

[51] Int. Cl.$^5$ ............... B01D 36/00; B01D 17/12
[52] U.S. Cl. ............... 210/143; 204/302; 204/306; 210/167; 210/169; 210/243; 210/259; 210/290; 210/411; 422/186.3
[58] Field of Search ............... 210/143, 169, 243, 258, 210/259, 284, 411, 167, 192, 290, 748, 900; 22/186.3; 204/152, 186, 302, 305, 306

[56] References Cited

U.S. PATENT DOCUMENTS

| | | | |
|---|---|---|---|
| 3,887,459 | 6/1975 | McLaughlin | 210/748 |
| 3,936,376 | 2/1976 | Centineo | 210/748 |
| 4,013,556 | 3/1977 | Evans | 210/748 |
| 4,141,830 | 2/1979 | Last | 210/748 |
| 4,152,266 | 5/1979 | Lazovsky et al. | 210/291 |
| 4,179,347 | 12/1979 | Krause et al. | 210/764 |
| 4,290,882 | 9/1981 | Dempsey | 210/748 |
| 4,326,954 | 4/1982 | Shroyer | 210/748 |
| 4,372,860 | 2/1983 | Kaas | 210/748 |
| 4,661,258 | 4/1987 | Phillips | 210/748 |
| 4,752,401 | 6/1988 | Bodenstein | 210/169 |
| 4,800,011 | 1/1989 | Abbott et al. | 204/302 |
| 4,808,287 | 2/1989 | Hark | 210/900 |
| 4,836,929 | 6/1989 | Baumann et al. | 210/748 |
| 4,865,749 | 9/1989 | Yoshida | 210/748 |
| 4,886,593 | 12/1989 | Gibbs | 210/748 |
| 4,948,514 | 8/1990 | MacGregor et al. | 210/748 |
| 4,963,268 | 10/1990 | Morse | 210/748 |
| 5,047,146 | 9/1991 | Bastenhof | 210/291 |

FOREIGN PATENT DOCUMENTS

| | | | |
|---|---|---|---|
| 2008465 | 1/1990 | Japan | 210/169 |
| 2059007 | 2/1990 | Japan | 210/169 |

OTHER PUBLICATIONS

Brochure—"Advanced Pure Water Technology", Diamond TM No date Water Systems Inc., 530 Main Street, Holyoke, Mass. 01040.
Brochure—"Sidestream Filters", Diamond TM Water Systems, 530 Main Street, Holyoke, Mass., 01040, No date.
Brochure—"Variable Flow Filtration System", Diamond TM Water Systems Inc., 530 Main Street, Hokyoke, Mass., 01040, No date.
Brochure—"Full Flow Systems", Diamond TM Water Systems, 530 Main Street, Holyoke, Mass., 01040 (2 pages).
Brochure—"Cooling Water Filtration Systems", Diamond TM Water Systems, 530 Main Street, Holyoke, Mass., 01040 (3 pages).
"The ESSA Static Probe Installation and Applications Manual", ESSA, 7640 Edgcomb Drive, Liverpool, N.Y. 13088.
"IH-12L 315 GGPM", Ideal Horizons Rutland, Vt.
"IH Series UV Disinfection Equipment Specifications", Ideal Horizons, Rutland, Vt.

Primary Examiner—Joseph W. Drodge
Attorney, Agent, or Firm—Cesari and McKenna

[57] ABSTRACT

A system minimizing inorganic and organic contaminants in water circulating in a water system comprises a flow-through filter vessel containing a filter medium and whose outlet is connected by a conduit to a flow-through radiation chamber containing a source of ultraviolet light. An electrostatic probe is inserted into the conduit between the filter vessel and the radiation chamber to subject the water flowing through the conduit to an intense electrostatic field. The filter vessel, conduit and chamber are connected in series to a pump and water utilization apparatus such as a cooling tower, pool or the like so that the water circulates through the filter and the electrostatic field before it enters the radiation chamber to maximize the effectiveness of the radiation chamber in killing organic contaminants entrained in the water.

8 Claims, 1 Drawing Sheet

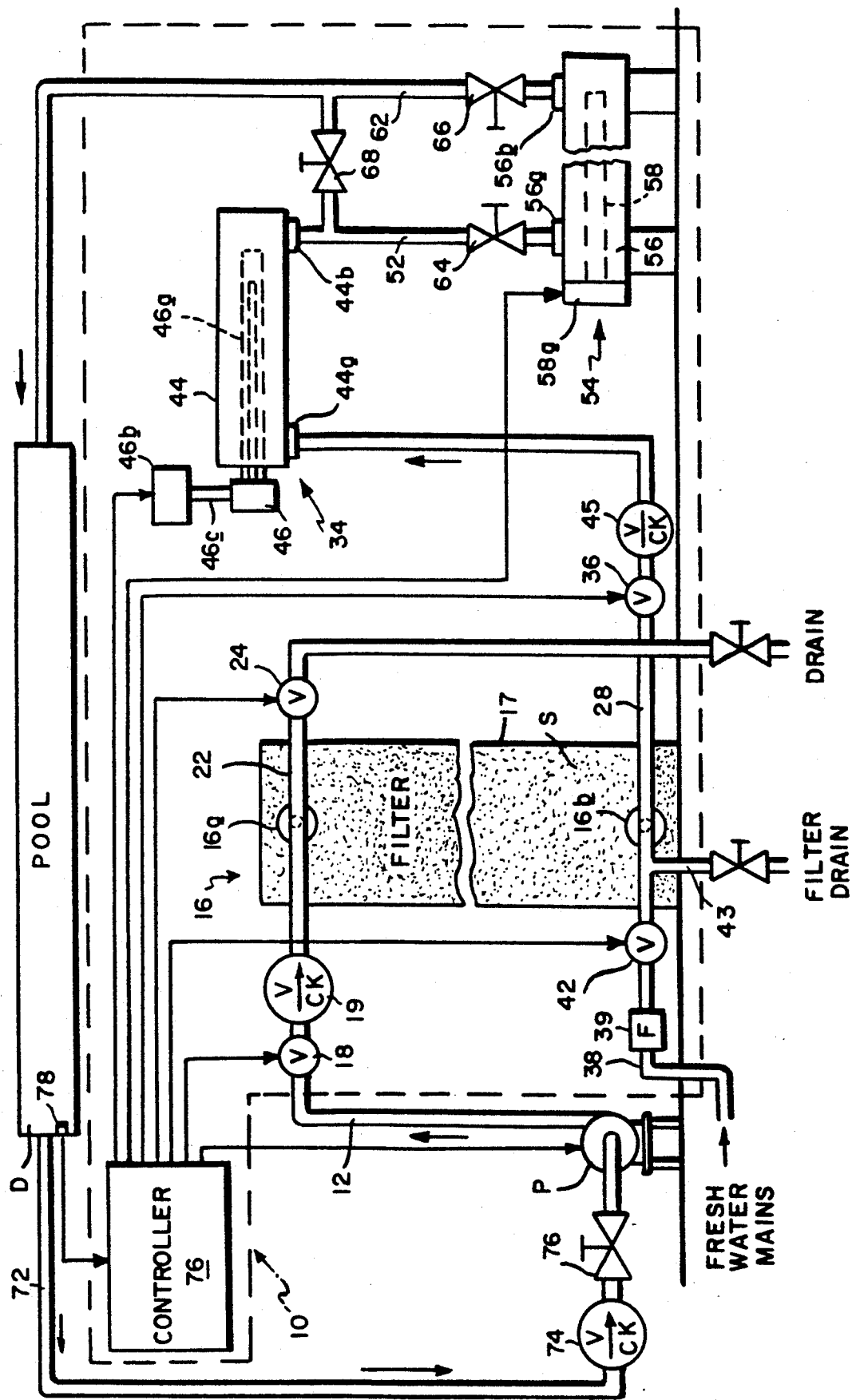

WATER DECONTAMINATION SYSTEM WITH FILTER, ELECTROSTATIC TREATMENT AND UV RADIATION CHAMBER

This invention relates to a 501 water decontamination system. It relates more particularly to a system for minimizing suspended solids and live biological organisms in various water systems.

BACKGROUND OF THE INVENTION

In closed loop water systems and systems in which the water in service may vary due to changes in service demand, the water usually becomes contaminated by both suspended solids and biological growth. For example, in a system which loses water, make up water must be added in order to maintain a given volume of water in the system. However, this process of adding water eventually results in a concentration of dissolved inorganic matter such as metallic salts, e.g., calcium and magnesium. Depending upon the nature of the dissolved salts and the temperature of the solution, these salts can precipitate out as carbonate scale on the interior surfaces of the system. Such scale may occlude or even stop the flow of water through the system. It also causes friction losses and thermal losses at heat transfer surfaces. In addition, the scale functions as a host substance upon which, and inside the crevices of which, algae and/or bacteria can grow. Also, in systems including open bodies of water, e.g. cooling towers, pools, fish hatcheries, etc., circulating water often picks up dirt, bacteria, pollen, stack emissions and other pollutants from the air. The presence and growth of algae and microorganisms are also a problem in systems such as this. Algae can cause plugged water passages. Also, some bacteria produce acids which can attack metal surfaces directly. Other types of bacteria, e.g. nitrifying bacteria, react with dissolved ammonia to produce nitric acid which can attack metal surfaces.

There are a variety of known techniques for minimizing the build up of scale in water systems and for minimizing the growth of organisms such as bacteria and algae. For example, chemical agents have been used to change the nature of the material in the water or to treat surfaces so that the material in the water does not affect the surfaces. These agents include scale inhibitors, wetting agents, algacides, acids, each with its own job to do. However it is difficult to keep all of these chemicals in balance because of changing conditions in the system. Also, such chemicals become a hazard to the environment through blow-down and material handling.

To avoid having to use such chemicals, some water systems incorporate filters in order to remove materials such as scale particles and algae entrained in the circulating water.

It is also known that the growth of algae can be greatly inhibited or prevented by exposing the circulating water to ultraviolet light. Accordingly, in some systems, the water is flowed through one or more radiation chambers bathed in ultraviolet light. However, this procedure has not been entirely satisfactory because the water usually contains an appreciable amount of suspended solids or turbidity which prevents the ultraviolet light emitted by the light source from propagating through the water far enough to kill all the orqanisms entrained in the water before the water passes out of the radiation chamber.

The effectiveness of radiation chambers in removing algae and other biological organisms is also degraded because, as noted above, inorganic material, i.e., dissolved salts, tends to plate out on the warmer surfaces or the system forming scale. Therefore, after the ultraviolet lamps have been in use for only a relatively short period of time, scale forms on the surfaces of the lamps, dramatically reducing the intensity of the radiation from those lamps and greatly reducing their effectiveness in killing biological organisms in the water.

It is also known that an electrostatic field can effect the electrochemical characteristics of the various metallic salts, such as magnesium and calcium, which are the building blocks of scale in all water systems. In fact, some systems incorporate one or more electrostatic probes, each of which projects into the water being circulated and is energized so that an electrostatic field emanates from the probe into the water. The electrostatic field affects the valence of the metallic salts dissolved in the water so that the salts tend to remain in solution.

Also, since the salts are now more easily held in solution, additional salts can be absorbed by the water so that previously deposited scale actually tends to redissolve. Resultantly, the use of such probes may result in scale being removed from internal surfaces of the system over time. It is also been found that such electrostatic fields upset the electrochemical balance of biological components in the water, such as bacteria and algae, so that their reproductive capacities are inhibited.

While each of the aforesaid devices, i.e., filter, ultraviolet light source and electrostatic probe have been used heretofore in diverse water systems to improve the characteristics of the water circulating in those systems, to our knowledge, they have never been organized as described hereinafter so that the three different devices combine, coact and operate in synergism to maximize the effectiveness of each of the devices in the performance of its function thereby to optimize the removal of inorganic and organic contaminants from water circulating in such water systems.

SUMMARY OF THE INVENTION

Accordingly, it is an object to the present invention to provide an improved water decontamination system which achieves filtration and disinfection of the water circulating in the system.

Another object of the invention is to provide a system of this type which is fully automatic and capable of periodic self-cleaning.

Still another object of the invention is to provide such a system which requires a minimum amount of maintenance.

Other objects will, in part, be obvious and will, in part, appear hereinafter.

The invention accordingly comprises the features of construction, combination of elements and arrangement of parts which are exemplified on the following detailed description, and the scope of the invention will be indicated in the claims.

Briefly, our system reduces suspended solids and eliminates biological organisms from the water circulating in a water system by first filtering the water to remove suspended particles, then flowing the filtered water across an electrostatic probe to achieve scale control and then passing the treated water through an ultraviolet radiation chamber to kill biological organisms present in the water. The order of these devices in the system, i.e., filter, probe, radiation chamber is critical to the proper operation of the system.

The filter, which is a special graded layer sand filter to be described later, removes suspended particles in the water down to about 2.0 microns so that the water exiting the filter has minimal suspended solids and is essentially nonturbid. Consequently, the water flowing past the probe to the radiation chamber will have a maximum transmittance.

The electrostatic probe component of the system 10 performs its usual function of producing an electrostatic field which inhibits the dissolved solids in the water from precipitating into crystalline scale on the interior surfaces of the system. However, it is the placement of the probe between the filter and the radiation chamber which is critical because the field emanating from the probe at this location prevents the dissolved solids from plating out on the warm surfaces of the ultraviolet lamps in the radiation chamber, and thus blocking that light. Rather, those dissolved solids will tend to precipitate out of solution downstream from the radiation chamber so that any newly formed suspended solids will be removed from the water during the next pass of the water through the filter.

The third component of the system, i.e., the radiation chamber, exposes biological organisms entrained in the water to ultraviolet radiation. The placement of the chamber downstream from the filter and the electrostatic probe assures that the intensity of the radiation from the ultraviolet lamps in the chamber will be undiminished by scale on the lamps and that the water entering the chamber will be essentially nonturbid so that even the organisms in the water furthest from the lamps will be exposed to a lethal dose of radiation during a single pass through the radiation chamber.

It will be appreciated from the foregoing that in our system, scale formation is caused to occur for the most part in the water flow path downstream from the radiation chamber. Therefore, the need to shut down the system in order to remove scale from the surfaces of the probe and within the radiation chamber is minimized. As will be described in detail later, once the filtration medium in the filter becomes saturated with scale particles and other solid contaminants filtered from the water, provision is made for automatically reversing the water flow through the filter to loosen the filter medium and discharge those contaminants to a drain in a minimum amount of time using a minimum amount of added water.

BRIEF DESCRIPTION OF THE DRAWING

For a fuller understanding of the nature and objects of the invention, reference should be had to the following detailed description, taken in connection with the accompanying drawing which is a block diagram of a water decontamination system embodying this invention incorporated into a water circulation system for a pool.

DESCRIPTION OF PREFERRED EMBODIMENT

Refer now to the drawing figure. It illustrates our decontamination system, indicated generally at 10, incorporated into a water circulation system for a decorative pool D. Although we are describing our system in this context, it should be understood that the system also has application in many other contexts in which contamination of a liquid by inorganic and organic materials poses a problem, such as cooling towers, process equipment cooling systems, spray humidification systems, domestic hot water systems, fish hatcheries, waste treatment plants, etc.

In the illustrated system serving pool D, a pump P circulates water through a pipe 12 to system 10, and more particularly to the side inlet 16a of a filter 16 in that system. The flow of water through pipe 12 is controlled by an automatic, i.e., pneumatically or electrically operated, valve 18. Connected to pipe 12 between inlet 16a and valve 18 is a check valve 19 to prevent back flow from the filter to the pump. Also connected to inlet 16a is a drain pipe 22, the flow of water through the drain pipe being contolled by an automatic valve 24.

Preferably filter 16 is of the type marketed by Diamond Water Systems, Inc., Holyoke, Mass. The filter comprises a containment vessel 17 mostly filled with a quartz filter medium S in the form of graded layers of sand, with the coarseness of the sand particles in each layer increasing from the top to the bottom of the vessel 17. Water enters the top of the filter through side inlet 16a and is directed toward the opposite wall of the filter vessel 17. Upon impact with that wall, the water reverses direction and, as it passes through the lighter medium at the top of the vessel 17, a portion of that medium is placed in suspension rising to the top of the filter vessel, while lower portions of the medium bed tighten up or compress so that contaminants tend not to penetrate down through lower layers of the medium bed. The turbulantly suspended medium causes most of the contaminants to remain above the medium bed, thus allowing clean water to penetrate through the medium, leaving the filter 16 through the side outlet 16b near the bottom of the filter vessel 17.

A pipe 28 conducts water from the filter outlet 16b to an electrostatic probe shown generally at 34, the flow of water from filter 16 to probe 34 being controlled by an automatic valve 36. Also, a fresh water line or mains 38 is connected by way of a flowmeter 39 to filter outlet 16b, the flow of water in that line 38 being controlled by an automatic valve 42. Flowmeter 39 measures the amount of fresh water introduced into filter 16 during the filter cleaning or backwash cycle to be described later. Preferably also, a valved drain line 43 connects to pipe 28 between outlet 16b and valve 42 to enable filter 16 to be emptied of water in the event it becomes necessary for one reason or another, e.g. to replace the filter bed.

The illustrated electrostatic probe 34 is shown as being elevated above the floor or ground. Accordingly, a check valve 45 is provided in pipe 28 to prevent backflow from the probe to the filter 16.

Electrostatic probes such as probe 34 are known, one such probe being described in U.S. Pat. No. 4,886,593. Suffice it to say that probe 34 comprises a generally cylindrical conductive housing 44. The exit end of pipe 28 connects to the inlet 44a of housing 44 and water leaves that housing by way of a side outlet 44b. Projecting into the end of housing 44 opposite inlet 44a is a high voltage emission electrode 46, which is surrounded by an insulating sheath 46a. In cases where the pipe size of the system exceeds four inches or so, housing 44 may consist of a conventional metal pipe elbow and electrode 46 may be inserted directly into the elbow through the threaded access opening found in many such elbows. In any event, a controllable d.c. power supply 46b applies a high voltage, e.g., 10,000 volts, to the emission electrode by way of a cable 46c.

When the electrode is energized, a very intense electrostatic field is established between the electrode and the wall of housing 44, which is maintained at electrical ground. All of the water flowing through housing 44 is exposed to that field. The field tends to align the ions in solution in the water flowing through housing 44 in the same direction so that they tend to remain in solution, inhibiting the buildup of scale. The field also inhibits the build-up of bacteria, algae and other biological contaminants by upsetting their reproductive cycles.

The water from the probe outlet 44b is conducted by a pipe 52 to an ultraviolet radiation chamber shown generally at 54. That chamber includes a housing 56 which receives the effluent from pipe 52 at a side inlet 56a. Water leaves the housing 56 through a side outlet 56b. As it flows through the housing, the water is subjected to ultraviolet radiation from at least one ultraviolet lamp 58 is positioned in housing 56 and energized by a control section 58a mounted to the housing. The lamp 58 emits radiation having a wavelength less than 300 nanometers and preferably about 254 nanometers. The size of chamber 54 should be large enough to handle a liquid flow in the order of 1.5 to 2.0 times larger than the rated flow through the system. With this flow, the water will be resident in the chamber long enough to be subjected to a radiation dosage of about 40,000 mw seconds/cm$^3$ which is sufficient to kill most organisms in the water. A suitable chamber 54 of this general type is available from Ideal Horizons, Rutland, Vt.

The water leaving the chamber 54 outlet 56b is conducted by a pipe 62 to one end of pool D. Preferably, manual isolation valves 64 and 66 are provided in the pipes 52 and 62 to and from the chamber 54. Also, a valved bypass line 68 extends between those pipes at probe outlet 44b. Thus, by closing valve 64 and 66 and opening valve 68, the chamber 54 may be isolated from the rest of system 10 in the event that the chamber has to be repaired or for some other reason.

Water is circulated from pool D back to the pump P through a pipe 72 which includes a check valve 74 to prevent back flow to the pool and an isolation valve 76.

It is a feature of the invention at all of the various active components of system 10, i.e. pump P, probe 34 and chamber 54, as well as the valves which control the fluid flows between those components are all controlled so that the system operates automatically to filter and disinfect the water circulating through pool D. For this, the system includes a programmable controller 76. Controller 76 controls the operation of pump P. It also controls the operation of the electrostatic probe 34 by sending an appropriate signal to the probe's controllable power supply section 46b to turn the probe on and off at the appropriate times. Another control signal from the controller is applied to control section 58a to turn the ultraviolet lamp 58 of chamber 54 on and off. Other electrical or pneumatic control signals from controller 70 control the operation of the automatic valves 18, 24, 36 and 42. These signals derive from timing circuits in the controller which may be set by appropriate front panel controls on the controller.

When the pool D and system 10 are being filled with water initially, the actutation of a front panel control causes controller 70 to issue signals to open all automatic valves. The manual filter drain valve and bypass valve 68 are closed at this time, while the manual drain line valve is left open. Water thus fills system 10 and pool D. As soon as water flows through drain pipe 22 indicating that filter 16 is filled with water, valve 24 may be closed. After section 10 and the pool are fully charged with water, valve 42 is closed and pump P is energized so that water begins circulating, i.e., counter-clockwise in the drawing figure. Also, the controller energizes probe 34 and lamp 58. Actually, the switching over to normal operation may be initiated by a signal to the controller from a water level detector 78 in pool D.

The pump P, probe 34 and lamp 58 may be operated continuously or intermittently under the control of the controller's timing circuits depending upon the particular application and the propensity for the water to become contaminated with scale and/or organic material under the prevailing conditions, such as mineral content in the water, water temperature, atmospheric pollution at the pool, etc.

In any event, during normal operation of the system, the water pumped from the pool D is first circulated through the filter 16, then through probe 34 and finally through the radiation chamber 54 before being returned to the pool. The medium S in filter 16 comprises graded layers of sand which are able to remove suspended solids in the water passing through the filter down to a size of about 2.0 microns. Accordingly, the water leaving the filter is quite clear and non-turbid. The water then flows through the probe 34 where it is exposed to the intense electrostatic field surrounding electrode 46 which alters the electrochemical balance of the water so that dissolved salts therein tend not to precipitate out as hard, crystalline scale. Rather, the field encourages the formation of soft precipitates which tends to remain in suspension as the water flows through pipe 52 to radiation chamber 54. Resultantly, there is minimal tendency for scale formation inside chamber 54, particularly on the warm surfaces of the ultraviolet lamp 58. Rather, any scale formation is caused to occur beyond chamber 54 and any resultant scale particles will be captured by filter 16.

With the removal of the suspended solids by filter 16 and the electrochemical change in the water to inhibit scale formation, the water entering chamber 54 is conditioned to optimize the effect on the water of the radiation produced by the chamber. As noted above, during its residence time in the chamber, the entire contents of the chamber is subjected to a lethal dose of radiation. Accordingly, substantially all biological contaminants entrained in the water passing through chamber 54 will assuredly be killed by that radiation before they leave that chamber.

The medium S in filter vessel 17 will remain relatively free of contamination due to the construction of the filter as described above. After a period of sustained operation, however, the upper layer or layers of the medium may become saturated with scale particles and other solid contaminants, necessitating backwashing of the filter medium. However, since the contamination is confined principally to the top few layers of the medium, backwashing of the filter can be accomplished in a minimum amount of time and with a minimum addition of fresh water to the system.

Backwashing may be initiated manually by an operator using an appropriate front panel control on controller 70 or it may be carried out automatically by the controller at appropriate timed intervals. The backwashing routine may also be initiated by detecting an increased pressure differential across filter 16, by suitable means such as a differential pressure switch. In any event, when the backwashing routine is initiated, controller 70 turns off pump P, probe 34 and lamp 58 and closes valves 18 and 36. The controller also opens valves 24 and 42 so that fresh water enters the outlet 16b of filter 16 by way of pipe 38. The added water is driven up through the filter medium under mains pressure forcing any contaminants in the upper layers of the medium out through the filter inlet 16a whereupon they are flushed via pipe 22 to an appropriate drain. Flowmeter 39 measures the amount of water flowed to filter 16 and sends signals to controller 76 reflecting this information. After a selected volume sufficient to clear the filter has been passed to the filter, controller issues signals to close valve 24 and open valves 18 and 36 and to turn on pump P, probe 34 and chamber 54 so that normal operation is resumed.

The manual valves 62, 68 and 76 may be closed when necessary in order to isolate pool D from system 10, e.g., in the event of a leak in one of the pipes connecting the pool to the system 10.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limited sense.

It is also to be understood that the following claims are intended to cover all of the generic and specific features of the invention described herein.

What is claimed is:

1. A liquid decontamination system for servicing liquid utilization apparatus, said system comprising
    a flow-through filter vessel having an inlet and an outlet and containing a filter medium;
    a flow-through radiation chamber having an inlet and an outlet and containing a source of ultraviolet light;
    fluid conducting means connected between the filter vessel outlet and the radiation chamber inlet for conducting liquid from the vessel to the chamber;
    probe means including an electrode and an electrically insulating sheath surrounding the electrode inside the conducting means for producing an intense high voltage, potentially on the order of thousands of volts, electrostatic field inside the conducting means which is of sufficient intensity to inhibit downstream scale formation by the conducted liquid,
    means for energizing said source, and means for applying a high voltage to said electrode so that liquid flowing from the vessel to the chamber is subjected to an intense electrostatic field before it enters said chamber.

2. The system defined in claim 1 and further including means for connecting the vessel inlet and the chamber outlet to a liquid path which includes a pump and utilization apparatus, and
    means for energizing said pump so the pump pumps liquid through the filter vessel and the conducting means to said chamber.

3. The system defined in claim 1 wherein
    said filter vessel inlet and outlet enter said vessel from the side, near the top and bottom of the vessel, respectively, and
    the filter medium comprises graded layers of sand, the sand particles in the layers increasing in coarseness from the top to the bottom of the vessel.

4. The system defined in claim 1 wherein said source emits light having a wavelength less than 300 nm.

5. The system defined in claim 4 wherein said source emits light having a wavelength of about 240 nm.

6. The system defined in claim 1 wherein said radiation chamber is sized to handle a liquid flow from 1.5 to 2.0 times larger than a rated flow through the system.

7. The system defined in claim 1
    wherein the conducting means include a valve for shutting off the flow of liquid from the filter vessel outlet through the conducting means, and
    further including
    a valved mains line in fluid communication with the conducting means at a location between the vessel outlet and said valve,
    a drain, and
    a valved drain line leading from the inlet of the filter vessel to said drain whereby by closing said valve and opening the valved mains and drain lines, liquid can be backflushed through the filter vessel to purge the filter medium therein of contaminants.

8. The system defined in claim 7 and further including a controller for automatically controlling the operations of the electrode, source, valve and valved lines.

* * * * *